Patented May 28, 1929.

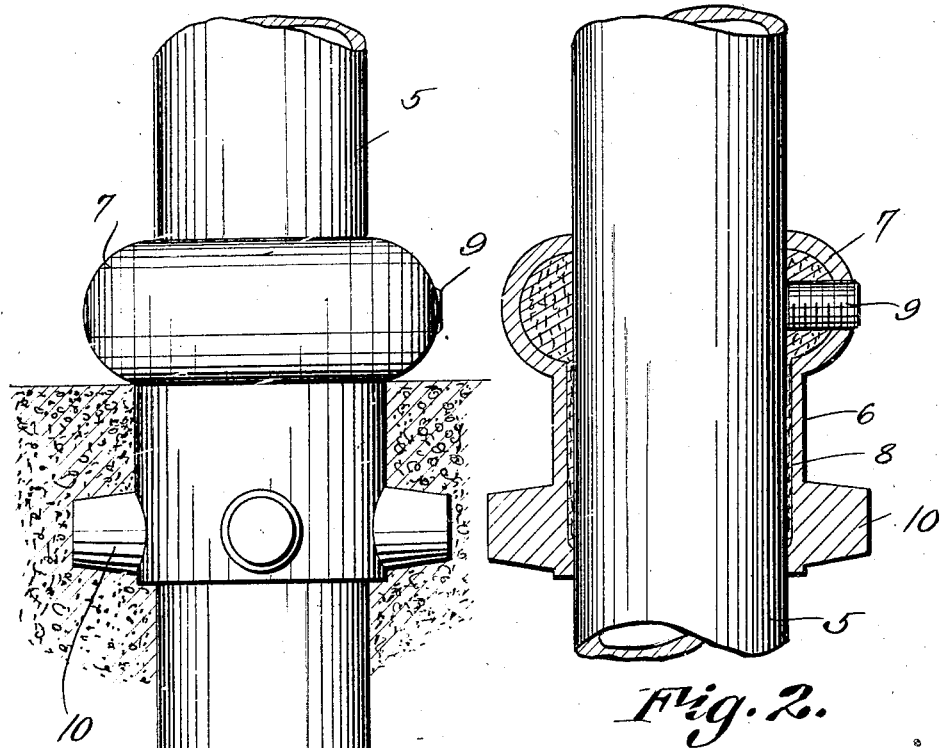
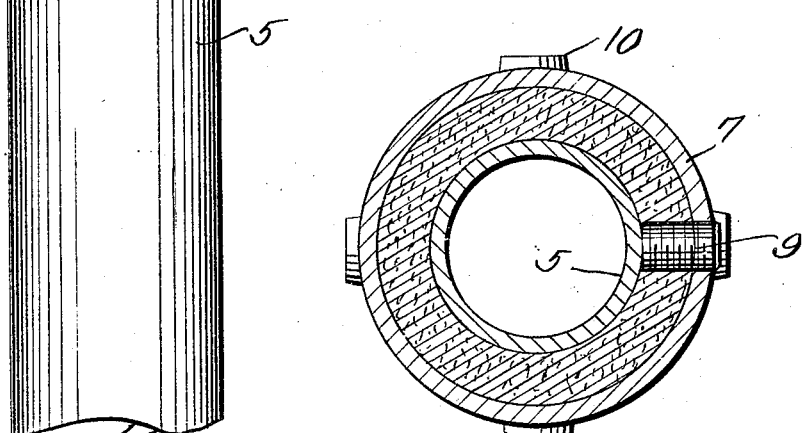

1,715,285

UNITED STATES PATENT OFFICE.

HERBERT H. GRUBB, OF BARABOO, WISCONSIN.

GREASE COLLAR.

Application filed October 17, 1927. Serial No. 226,786.

This invention relates to a collar designed for use in connection with uprights which are constructed of metal piping and used in the building of stalls, stanchions or the like wherein the uprights have their lower ends anchored in a concrete base.

In the construction of stalls and stanchions wherein metallic piping is used and embedded in a concrete surface, the piping rusts at a point adjacent to the surface of the concrete, to the end that the piping will break off at this point, making it necessary to dig up the concrete and replace the broken pipe with a new one.

It is therefore the primary object of this invention to provide a collar having a compartment for containing grease to protect the piping against the elements that cause rust.

Another object of the invention is to provide a device of this character which may be readily and easily refilled with grease, should the grease for any reason find its way from the compartment.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:

Figure 1 is a fragmental elevational view illustrating a pipe equipped with a grease collar constructed in accordance with the invention.

Figure 2 is a vertical sectional view through the grease collar, showing the pipe in elevation.

Figure 3 is a transverse sectional view through the pipe and grease collar.

Referring to the drawing in detail, the reference character 5 designates a pipe employed in the construction of a stall, stanchion or the like, the same having its lower end embedded in concrete in the usual and well known manner.

The reference character 6 designates the grease collar forming the essence of this invention, and as shown, includes a tubular body portion having an enlarged portion 7 defining a grease compartment so that grease may be positioned within the collar and held in close engagement with the pipe surrounded by the collar.

As shown, the inner diameter of the collar is slightly greater than the external diameter of the pipe providing a compartment 8 that extends to a point adjacent to the lower end of the collar so that grease forced into the grease compartment, will find its way to a point adjacent to the bottom of the collar protecting the pipe.

An opening is formed in the collar and accommodates the set screw 9 that is of a length to contact with the pipe to lock the collar to the pipe and hold the collar in position while the concrete in which the pipe is anchored, is setting.

Extending laterally from the collar are lugs 10, which lugs anchor the collar in position so that the collar will not become displaced within the concrete.

Should it be desired to refill the grease compartment, the threaded end of the discharge pipe of a grease gun may be positioned in the opening and grease forced into the compartment under pressure, thereby insuring the grease finding its way to a point adjacent to the bottom of the collar.

Therefore it will be seen that due to this construction, the pipe is protected at a point adjacent to the surface of the concrete and will not be affected by rust that causes the pipe to deteriorate and finally break off.

I claim:

A protecting collar for pipes embedded in concrete, including a body portion fitted over the pipe to be protected thereby and closely engaging the pipe at the lower end of the collar, said collar having an interior diameter greater than the exterior diameter of the pipe on which the collar is positioned defining a space between the collar and pipe, said collar having its upper end enlarged to provide a compartment communicating with the space between the collar and pipe, the upper extremity of the collar closely engaging the pipe to prevent material from passing from the collar, said collar having a threaded opening to permit grease to be positioned in the collar, a plug extending into the opening and contacting with the pipe to normally hold the collar in position, and laterally extended lugs formed integral with the collar to be embedded in the concrete in which the post and collar are positioned.

In testimony that I claim the foregoing as my own, I have hereto affixed my signature.

HERBERT H. GRUBB.